(12) United States Patent
Huss (10) Patent No.: US 10,367,661 B1
(45) Date of Patent: Jul. 30, 2019

(54) CONTINUOUS TIME LINEAR RECEIVER THAT MINIMIZES INTERSYMBOL INTERFERENCE DUE TO PRE-CURSOR DISTORTION

(71) Applicant: Cadence Design Systems, Inc., San Jose, CA (US)

(72) Inventor: Scott David Huss, Cary, NC (US)

(73) Assignee: CADENCE DESIGN SYSTEMS, INC., San Jose, CA (US)

( * ) Notice: Subject to any disclaimer, the term of this patent is extended or adjusted under 35 U.S.C. 154(b) by 0 days.

(21) Appl. No.: 15/376,525

(22) Filed: Dec. 12, 2016

(51) Int. Cl.
*H04L 25/03* (2006.01)
*H04L 1/00* (2006.01)
*H04L 12/26* (2006.01)

(52) U.S. Cl.
CPC ...... *H04L 25/03006* (2013.01); *H04L 1/0018* (2013.01); *H04L 43/028* (2013.01)

(58) Field of Classification Search
CPC . H03H 7/00; H03H 7/30; H03K 5/159; H04B 1/10; H04J 11/00; H04L 1/0018; H04L 7/00; H04L 25/03; H04L 25/26; H04L 25/03006; H04L 25/03057; H04L 27/01; H04L 43/028
USPC ....... 375/219, 229, 230, 232, 233, 316, 343, 375/346, 348, 350; 708/300, 323
See application file for complete search history.

(56) References Cited

U.S. PATENT DOCUMENTS

| | | | | |
|---|---|---|---|---|
| 9,313,054 B1* | 4/2016 | Liao | ................. | H04L 25/03019 |
| 9,397,867 B1* | 7/2016 | Azenkot | ........... | H04L 25/03019 |
| 2005/0190832 A1* | 9/2005 | Ibragimov | ......... | H03H 21/0012 |
| | | | | 375/233 |
| 2009/0092180 A1* | 4/2009 | Hollis | ............... | H04L 25/03019 |
| | | | | 375/232 |
| 2010/0177816 A1* | 7/2010 | Malipatil | .......... | H04L 25/03057 |
| | | | | 375/233 |
| 2010/0284686 A1* | 11/2010 | Zhong | ............... | H04L 25/03019 |
| | | | | 398/1 |
| 2015/0049798 A1* | 2/2015 | Hossein | ............ | H04L 25/03012 |
| | | | | 375/233 |

(Continued)

OTHER PUBLICATIONS

Manian et al., "A 40-Gb/s 9.2-mW CMOS Equalizer", 2015 Symposium on VLSI Circuits Digest of Technical Papers, Jun. 17-19, 2015, pp. C226-C227.

(Continued)

*Primary Examiner* — Shawkat M Ali
(74) *Attorney, Agent, or Firm* — Tarolli, Sundheim, Covell & Tummino LLP (57) ABSTRACT

A circuit and method for reducing intersymbol interference due to pre-cursor distortion. A first set of circuit elements located along a first circuit path of a receiver device process an analog input signal of the receiver to form an equalized representation of the input signal. A second set of circuit elements are located along a second circuit path that has lower latency than the first circuit path. The second set of circuit elements form a scaled signal as one of the following: a scaled representation of the input signal, an inverted scaled representation of the input signal, a scaled derivative of the input signal, and an inverted scaled derivative of the input signal. The scaled signal is combined with the equalized representation to cancel out a pre-cursor portion of the equalized representation.

20 Claims, 12 Drawing Sheets

(56) References Cited

U.S. PATENT DOCUMENTS

2016/0173299 A1* 6/2016 Islam ................ H04L 25/03057
375/233
2017/0295039 A1* 10/2017 Hidaka ............. H04L 25/03267

OTHER PUBLICATIONS

Agrawal et al., "A 19Gb/s Serial Link Receiver with Both 4-Tap FFE and 5-Tap DFE Functions in 45nm SOI CMOS", ISSCC 2012, Feb. 21, 2012, IEEE International Solid-State Circuits Conference; Digest of Technical Papers, pp. 134-136.

* cited by examiner

CONTINUOUS TIME LINEAR RECEIVER THAT MINIMIZES INTERSYMBOL INTERFERENCE DUE TO PRE-CURSOR DISTORTION

FIELD OF THE INVENTION

The present invention relates to reduction of intersymbol interference in electric circuits.

BACKGROUND

Intersymbol interference (ISI) is a serious problem in digital communications systems. ISI occurs when a symbol, composed of one or more bits transmitted at a specified symbol rate, interferes with a subsequent symbol so that the signal for the subsequent symbol becomes distorted. ISI also occurs when a subsequent symbol interferes with a preceding symbol. The former scenario is known as post-cursor ISI because the portion of the symbol after a main pulse (also called the main cursor) is known as the post-cursor, and it is the post-cursor that interferes with the main cursor of the subsequent symbol. The latter scenario is known as pre-cursor ISI because the portion of the symbol before the main cursor, i.e., the pre-cursor, interferes with the main cursor of a preceding symbol. Serial link communications systems, such as Serializer/Deserializer (SerDes) systems, are particularly susceptible to pre-cursor ISI.

Various ways have been developed to reduce ISI at both the transmitter end and the receiver end of a communications system. Existing methods attempt to equalize transmitted data signals, with the objectives of correcting for the effects of channel attenuation and complete cancellation of ISI. For example, a conventional serial receiver consists of an analog front end that generally includes a continuous time linear equalizer (CTLE), a sampler that quantizes the analog input into digital values, a decision feedback equalizer (DFE) that uses the quantized data to adaptively feedback a correction signal to the input of the receiver, and a timing recovery unit. CTLEs and DFEs are effective at removing post-cursor ISI, but fail to adequately correct pre-cursor ISI.

Some transmitters in serial link systems implement feed-forward equalization that provides fixed, i.e., non-adaptive, post-cursor ISI cancellation. However, the transmitter located feed-forward equalizer (FFE) in these serial link systems does not provide any adaptive pre-cursor ISI correction. It is possible to implement an FFE in the receiver. In fact, some receivers include a discrete time FFE that is implemented in the analog or digital domain. Such receivers can handle both pre-cursor and post-cursor ISI, but are structurally complex and consume a large amount of power.

More advanced serial link receivers provide for both pre-cursor and post-cursor ISI correction using tap weights that are calculated through an adaptive "back-channel" equalization path, to introduce a fixed amount of equalization (pre-cursor or post-cursor) into the transmitter or to allow the receiver to adaptively control an equalizer in the transmitter. The equalizer in the transmitter is generally implemented using a finite impulse response filter (FIR) with a set of adjustable taps to change the frequency response of the filter. However, these advanced receivers require implementing pre-cursor equalization in the transmitter—which is not always possible. For example, many communications standards such as High-Definition Multimedia Interface (HDMI), DisplayPort and Universal Serial Bus (USB) do not permit the use of pre-cursor equalization in the transmitter, whether adaptive or fixed.

Accordingly, a need exists for ways to effectively reduce pre-cursor and post-cursor ISI with low cost.

DETAILED DESCRIPTION

The present disclosure provides non-limiting representative examples referencing numerals to particularly describe features and teachings of different aspects of the invention. The described embodiments should be recognized as capable of implementation separately or in combination with each other. A person of ordinary skill in the art reviewing the present disclosure should be able to learn and understand the different described aspects of the invention. The described embodiments should facilitate understanding of the invention to such an extent that other implementations not specifically covered, but within the knowledge of a person of ordinary skill in the art having read the present disclosure, would be understood to be consistent with an application of the invention.

Embodiments of the present disclosure relate to pre-cursor ISI correction at the receiver end of a communications system. The embodiments are significantly simpler to implement and consume less power than other solutions, for example, compared to a conventional FFE in a receiver. In one embodiment, a received input signal is processed along a main path and a secondary path that has a lower latency than the main path. The main path forms an equalized signal from the input signal, using conventional equalization techniques such as a CTLE. The secondary path scales the input signal and is connected to the main path so that the scaled input signal is subtracted from the equalized signal to form a pre-cursor corrected signal. In another embodiment, the secondary path differentiates (forming the calculus derivative of) the input signal and scales the derivative, which is then subtracted from the equalized signal to form the pre-cursor corrected signal. The disclosed embodiments may be combined with conventional ISI correction techniques that address post-cursor ISI, such as using a DFE in the receiver.

Figure 1:
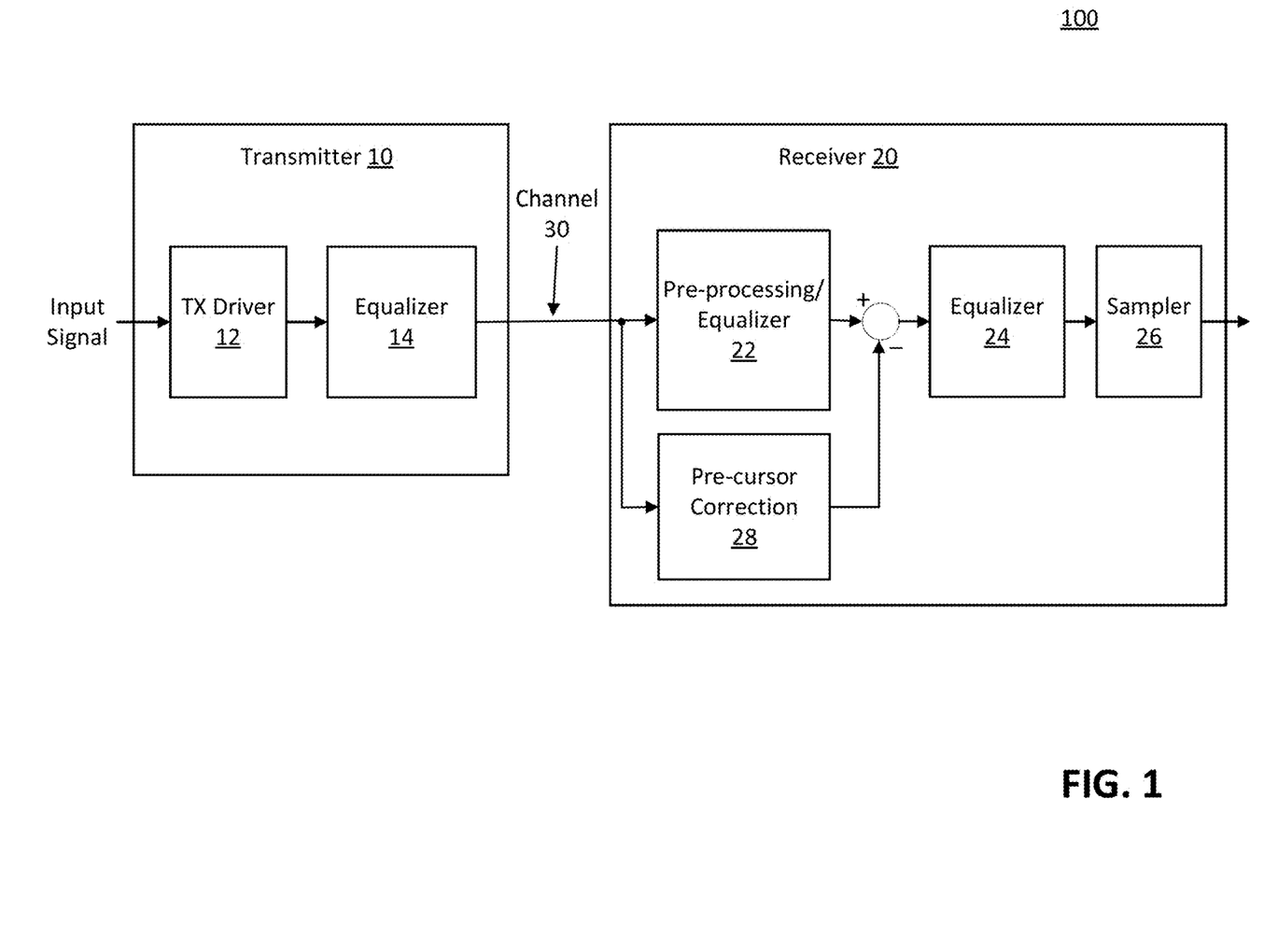
FIG. 1 is a block diagram of a system according to an embodiment of the present disclosure.

FIG. 1 is a block diagram of a communication system 100 according to an embodiment of the present disclosure. The system 100 includes a transmitter 10, a receiver 20, and at least one channel 30 connecting the transmitter to the receiver. The channel 30 may be unidirectional or bidirectional. Each channel may transmit data differentially using a positive polarity data signal and a negative polarity data signal. However, a single-ended implementation is also possible.

The transmitter 10 receives an input signal to be transmitted and transmits a representation of the input signal using a transmission (TX) driver 12. The system 100 may be a serial communication system, in which case the input signal may be serialized before or after being input to the transmitter. The TX driver forms a differential signal based on the input signal. The differential signal has a specified amplitude, the value of which may vary depending on the communication standard by which the transmitter communicates with the receiver.

The transmitter 10 may include an equalizer 14, which could be implemented, for example using the earlier mentioned FIR having adjustable tap weights. Shown separately in FIG. 1, the equalizer 14 and the TX driver 12 can be combined into a single circuit block. Although the disclosed embodiments are compatible with conventional ISI correction techniques that introduce equalization in either the transmitter or receiver, in keeping with the goal of ease of implementation and low cost, it may be preferable to keep the complexity of the equalization performed by the transmitter to a minimum. Thus, for example, the tap weights may be programmed once, e.g., during manufacture, and thereafter fixed so that the equalizer 14 is not adaptive. In fact, the equalizer 14 can be omitted entirely as both pre-cursor and post-cursor ISI can be effectively corrected at the receiver 20 using the methods described herein.

The input to the receiver 20 is processed through a main path comprising a first equalizer circuit 22, an additional equalizer circuit 24 and a sampler 26. The receiver 20 also includes a pre-cursor correction circuit 28 located along a second path connected to the input. In a serial system, the receiver 20 may further include a deserializer that deserializes the output of the sampler 26 into parallel streams of data, and a timing recovery unit that corrects the timing of the sampler and/or the deserializer.

The first equalizer circuit 22 of the main path may include any number of signal conditioning elements. Some of these elements can perform conventional equalization, for example, the circuit 22 may include a CTLE to provide some equalization in addition to the equalization provided by the equalizer circuit 24. The CTLE can be integrated with another element of the circuit 22. For example, CTLEs often include peaking amplifiers. The output of the equalizer circuit 22 is combined with the output of the pre-cursor correction circuit 28, e.g., by subtracting the latter output from the former to form a pre-cursor corrected signal that is subject to further processing by the equalizer circuit 24.

The pre-cursor correction circuit 28 is configured to receive the input signal simultaneously with receipt of the input signal at the equalizer circuit 22. There may be multiple channels that simultaneously communicate data between the transmitter and the receiver, in which case the pre-cursor correction circuit 28 may receive and separately process data signals from all of the channels. The pre-cursor correction circuit 28 reduces the amount of pre-cursor present in the input signal before processing by the second equalizer circuit 24.

The equalizer circuit 24 may be implemented using a CTLE and/or a DFE and applies a conventional equalization technique that (possibly in combination with the equalization provided by the CTLE 22) removes any residual post-cursor that may remain after the pre-cursor correction. This may include a post-cursor that was present in the received input signal in addition to post-cursor effects that, as will be explained, may be introduced during pre-cursor correction.

The sampler 26 converts the output of the equalizer circuit 24 into digital 1's and 0's to form a stream of digital pulses that can be further processed, either within the receiver or by an external device connected to the receiver. The sampler 26 may include analog-to-digital conversion elements such as comparators, voltage reference generators, memory latches, shift registers, etc.

Figure 2:
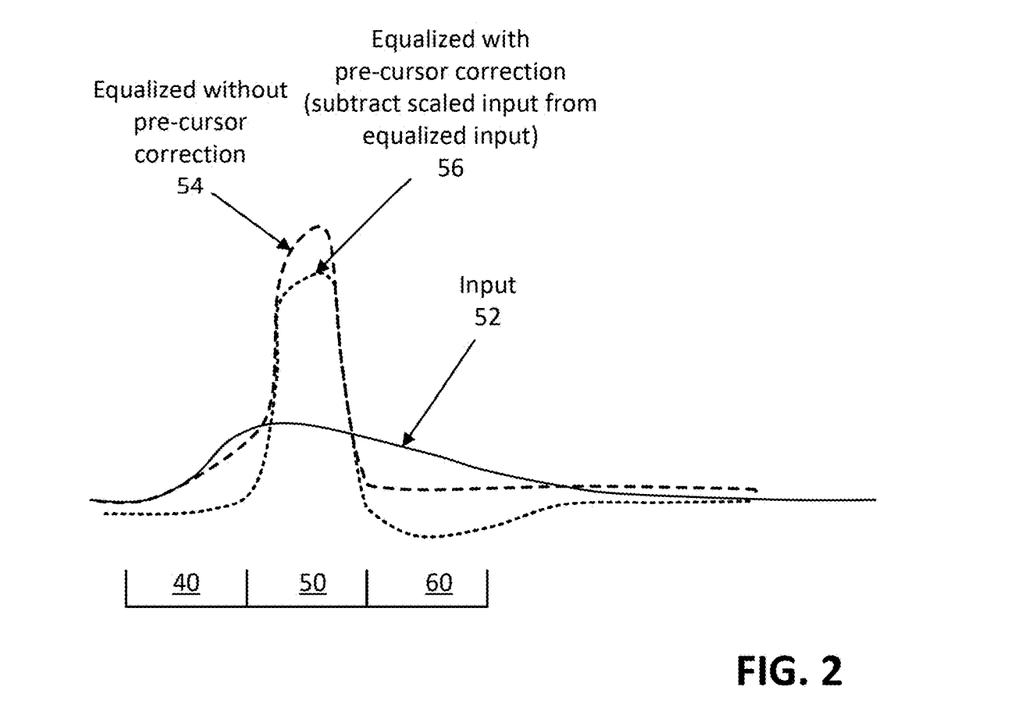
FIG. 2 is a graphical illustration of a method for pre-cursor ISI correction according to an embodiment of the present disclosure.

FIG. 2 is a graphical illustration of a first pre-cursor ISI correction method according to an embodiment of the present disclosure. FIG. 2 shows a waveform for a received data signal, input signal 52. Data signals can be voltage or current signals, but for discussion purposes, assume that data are transmitted using voltages. The input signal 52 is supposed to carry a logical 1 value, e.g., a single pulse with a peak above a minimum threshold voltage for 1 and surrounded on both sides by voltages below a maximum threshold voltage for 0. Instead, as shown in FIG. 2, the input signal 52 is severely distorted by ISI and has a very low peak that spreads out beyond a time interval 50 corresponding to the main cursor for the input signal, spreading into a pre-cursor interval 40 and a post-cursor interval 60.

There exists some inherent latency in the main path of any receiver. To correct the input signal 52, the input signal is processed along a secondary path that has lower latency. In the secondary path, the input signal 52 is scaled to form a scaled signal. At the same time, the input signal 52 is equalized using, for example, a CTLE located along the main path to form an equalized signal 54. The scaled signal is then subtracted from the equalized signal 54 to cancel the pre-cursor, thereby forming a pre-cursor corrected signal 56. As seen in FIG. 2, the equalized signal 54 has a significantly improved peak at the main cursor, but has some residual pre-cursor that the main path equalizer failed to correct. If the input signal 52 is scaled appropriately, the residual pre-cursor can be canceled out of the equalized signal 54. The resulting signal 56 has almost no pre-cursor. However, the subtraction also provides some unwanted post-cursor cancellation that may overcorrect the equalized signal in the post-cursor region 60. If the receiver has adaptive equalization, this over-correction can be compensated for by a corresponding reduction in the amount of equalization provided in the main path.

Figure 3:
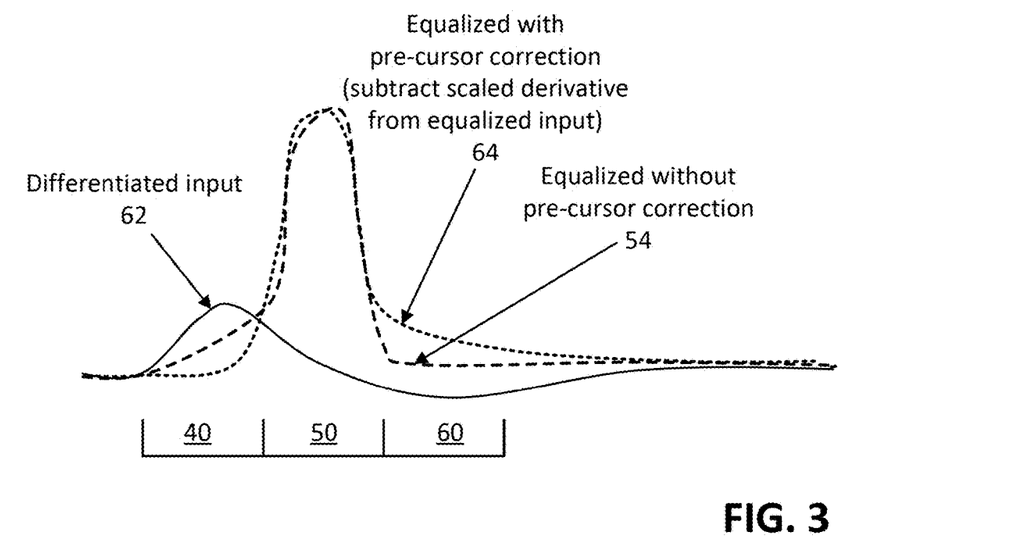
FIG. 3 is a graphical illustration of a method for pre-cursor ISI correction according to an embodiment of the present disclosure.

FIG. 3 is a graphical illustration of a second pre-cursor ISI correction method according to an embodiment of the present disclosure. The input signal 52 from FIG. 2 is simultaneously processed along a main path and a secondary path. In this instance, the secondary path implements a differentiating function to form the calculus derivative 62 of the input signal 52. The derivative 62 is scaled and then subtracted from the equalized input signal 54. Similar to FIG. 2, the subtraction introduces a small amount of post-cursor ISI. In this case, the post-cursor is shifted in the positive direction, whereas the post-cursor was negatively shifted in FIG. 2. However, a CTLE or DFE can correct post-cursor ISI in either direction, so any introduced post-cursor will ultimately be removed if one or more equalizer circuits in the main path include a CTLE or DFE. The method of FIG. 3 is more computation intensive than that of FIG. 2, but less sensitive to the latency of the main path. Additionally, the method of FIG. 3 does not significantly affect the overall gain, whereas the method of FIG. 2 will substantially reduce the amplitude of the main cursor and may therefore require additional amplification.

Figure 4:
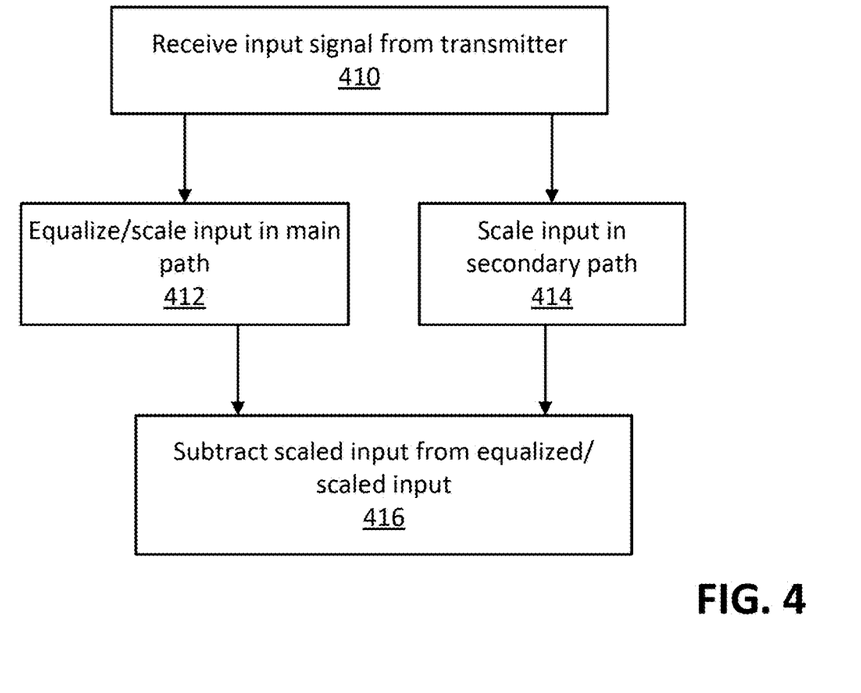
FIG. 4 is a flowchart of a method for pre-cursor ISI correction according to an embodiment of the present disclosure.

FIG. 4 is a flowchart of a method 400 corresponding to FIG. 2. In step 410, the receiver receives an analog input signal from the transmitter.

In step 412, the input signal is equalized and scaled by an equalizer circuit in the main path. The equalizer circuit may include a CTLE and a variable gain amplifier (VGA).

Step 414 is performed concurrently with step 412. In step 414, the input signal is scaled in the secondary path. A controller in the receiver may monitor the input signal to adjust a scaling coefficient by which the input signal is scaled. The scaling coefficient is applied, for example, to a VGA in the secondary path. The scaling adapts to the input and there are various ways to implement the adaptation. One way is to use an eye measurement tool that searches an adjustable parameter space (the parameters including a scale factor) to optimize the eye opening. Another way is to use a Least Means Square (LMS) algorithm that measures the correlation of a present data sample with a previous error sample(s) and adjusts the parameters to minimize this correlation.

In step 416, the scaled input of the secondary path is subtracted from the equalized and scaled input of the main path, thus combining signals from both paths to form a pre-cursor corrected signal that can be further processed, for example by an additional equalizer circuit in the main path and/or a sampler.

Figure 5:
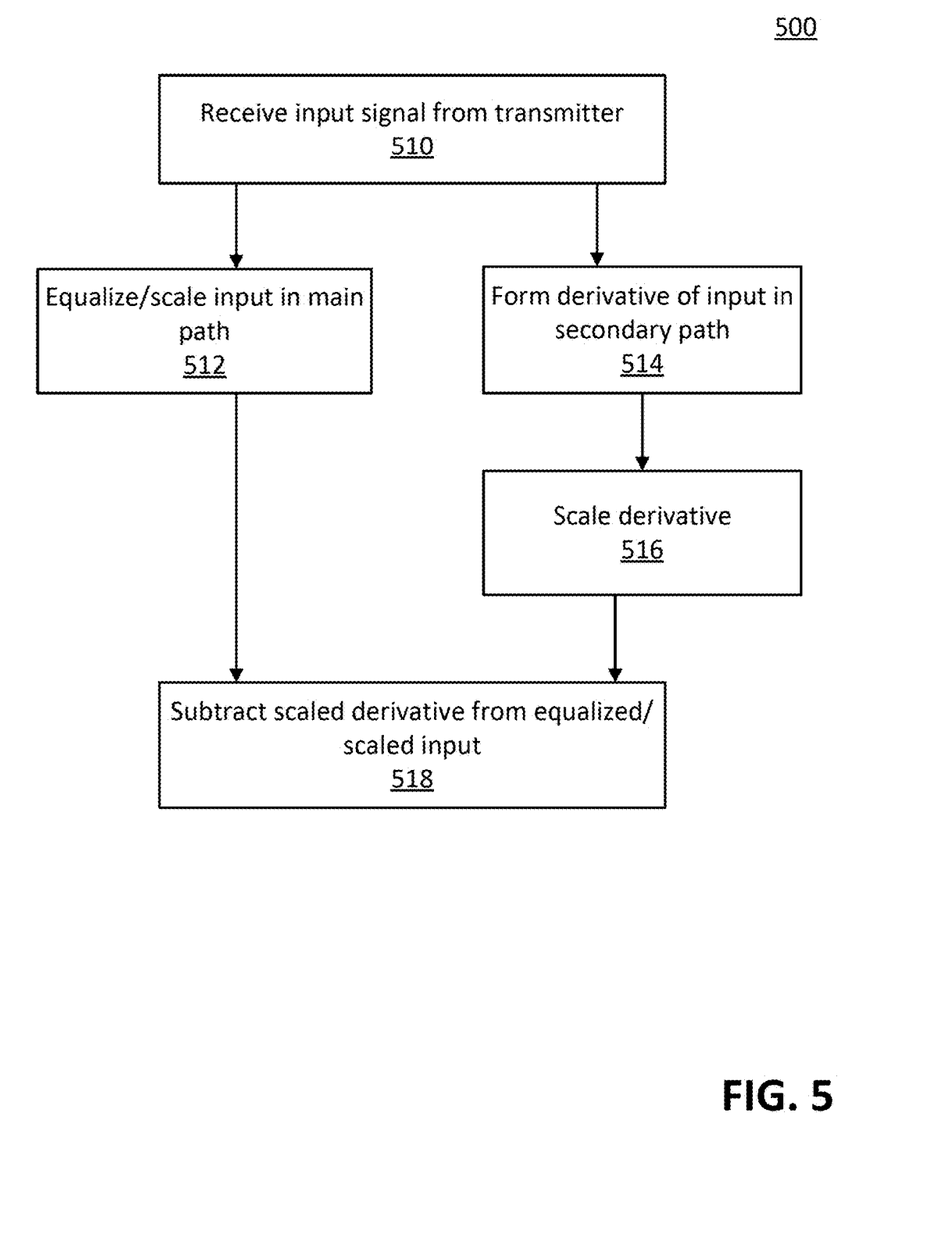
FIG. 5 is a flowchart of a method for pre-cursor ISI correction according to an embodiment of the present disclosure.

FIG. 5 is a flowchart of a method 500 corresponding to FIG. 3. In step 510, the receiver receives an analog input signal from the transmitter.

In step 512, the input signal is equalized and scaled in the main path, for example by a combination of a CTLE and a VGA.

Step 514 is performed concurrently with step 512. In step 514, a differentiating unit in the pre-cursor correction circuit of the secondary path calculates the derivative of the input signal.

In step 516, the derivative is adaptively scaled, for example, in a manner similar to the scaling of the input signal in step 414 of FIG. 4, although the amount of gain applied will be different.

In step 518, the scaled derivative is subtracted from the equalized input, thus combining the outputs of both paths to form a pre-cursor corrected signal that can be further processed.

Figure 6:
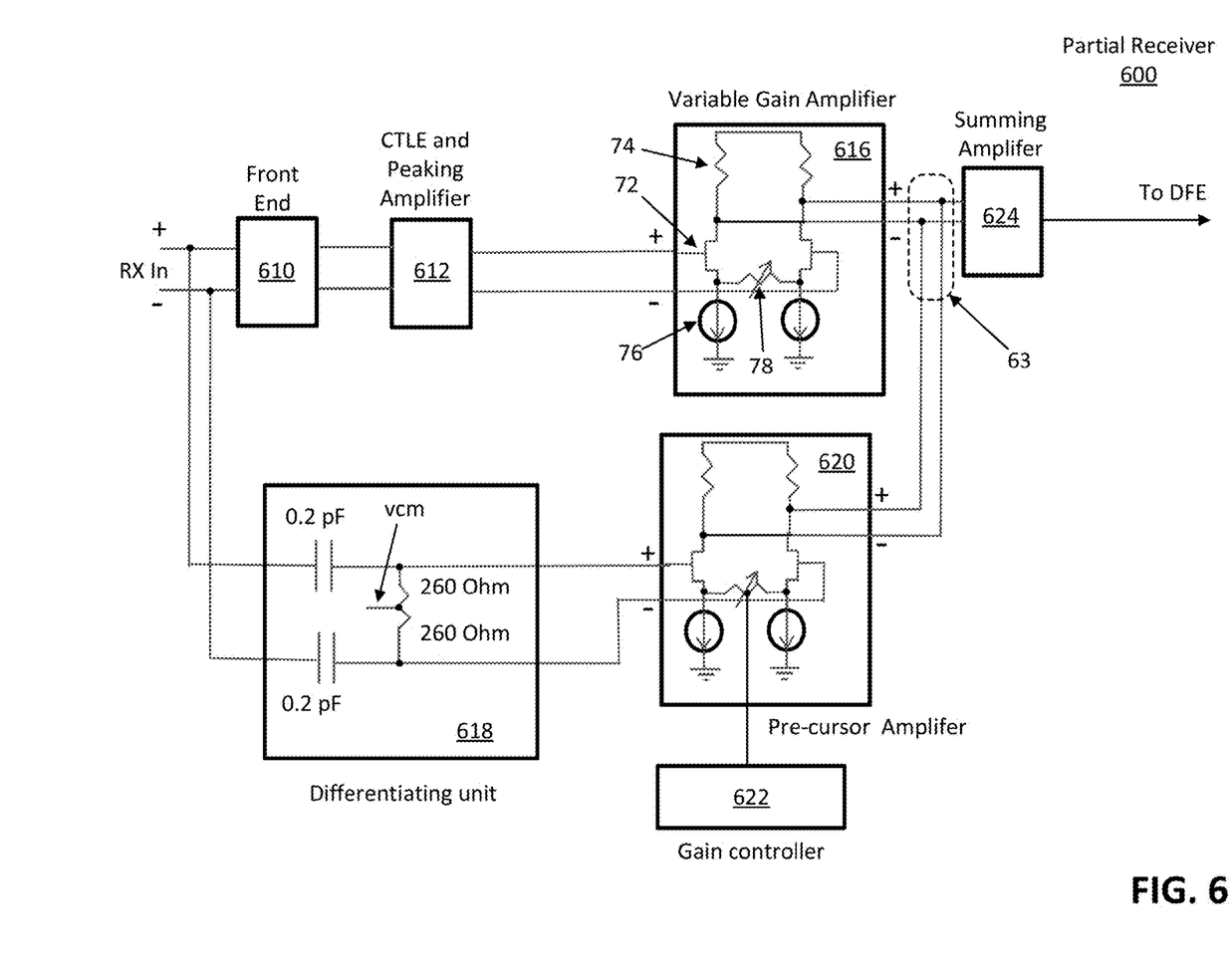
FIG. 6 is a block diagram of a portion of a receiver that implements pre-cursor ISI correction according to an embodiment of the present disclosure.

FIG. 6 is a block diagram of a partial receiver circuit 600 that implements pre-cursor ISI correction according to an embodiment of the present disclosure. The circuit 600 can be used to perform the method 500 and, with some minor modifications, the method 400. The circuit 600 includes an analog front end 610, a CTLE 612 with an integrated peaking amplifier, a VGA 616, a differentiating unit 618, a pre-cursor amplifier 620, a gain controller 622 and a summing amplifier 624. The elements 610, 612, 616 and 624 are located along a main path that leads to an equalizer circuit, for example, a DFE. The elements 618 and 620 are located along a secondary path that connects to the main path.

The front end 610 receives a differential input signal via a channel that transmits the input signal as a positive polarity signal and a negative polarity signal. The front end 610 provides a resistive termination to meet a required return loss. The front end 610 may include a DC blocking capacitor to enable the peaking amplifier to be independently biased using a DC bias voltage. In some implementations, the front end 610 may attenuate the input signal, for example, to maintain linearity.

Peaking amplifiers are designed to provide a peak output, i.e., maximum gain, at a specific frequency, and can generally provide more gain at the Nyquist frequency (half the symbol rate) relative to DC. Thus, the peaking amplifier portion of CTLE 612 can be designed or configured so that its highest gain is produced at approximately the Nyquist frequency. The amount of gain is predetermined based on an expected transfer function of the input signal. In this way, the peaking amplifier provides a frequency dependent, analog equalization of the input signal. The CTLE 612 may also have a peak response at approximately the Nyquist frequency. The CTLE 612 provides some equalization, including some post-cursor correction. However, in the configuration of FIG. 6, post-cursor correction is primarily achieved through subsequent processing of the pre-cursor corrected signal by the DFE.

The VGA 616 provides a variable gain that is adaptively adjusted by a controller in the receiver, for example, by the gain controller 622 executing a different adaptation algorithm than one used to control the pre-cursor amplifier 620. The VGA 616 maintains the average signal amplitude at a relatively constant level, which may be a required condition for the DFE to function properly. VGA 616 can be implemented using a differential amplifier with resistive loads and a degeneration resistor between a positive polarity current source and a negative polarity current source. This is illustrated in FIG. 6 with a pair of resistors 74 that form current paths to respective current sources 76 depending on an activation state of respective N-channel MOSFETs 72. The equalized input signal from the CTLE 612 forms gate inputs to the transistors 72. A degeneration resistor 78 is connected across the current sources 76 and the source terminals of the transistors 72. The output of the VGA 616 is formed at the drain terminals of the transistors 72. The gain of the VGA 616 is inversely proportional to the resistance value of the degeneration resistor 78. Alternative amplifier arrangements are possible, including differential amplifiers that use bipolar junction transistors instead of MOSFETs.

The secondary path produces a scaled derivative of the input signal and has lower latency than the main path so that the scaled derivative can be formed and applied fast enough to provide pre-cursor correction. The secondary path does not need to be synchronized to the main path. Instead, the latency difference between the paths need only be within a tolerance range that can vary, for example, depending on symbol rate.

The differentiating unit 618 can be implemented using AC coupling to provide an approximate differentiation of the input signal. Each polarity of the input signal is AC coupled by connecting the polarity across the series combination of a capacitor and a resistor, thus forming a first order (single pole) high-pass filter. The two resistors are connected in series to form a common mode voltage VCM at a shared node. VCM may be used to provide a bias voltage for the pre-cursor amplifier 620. The pole is set so that over the entire frequency range of the input signal, the high-pass filter approximates a differentiation function. The pole should be higher in frequency than the pole of the AC coupling network in the main path, e.g., AC coupling capacitors in the front end 610. A typical value for the pole frequency of the high-pass filter is around the Nyquist frequency. The resistance and capacitance values can be selected to provide an RC time constant that achieves a desired pole frequency. An example value for the capacitors is 0.2 picofarads. An example value for the resistors is 260 Ohms.

The pre-cursor amplifier 620 is a variable gain amplifier and can be implemented with the same circuit design as the VGA 616, but is controlled through a separate algorithm that is pre-cursor adaptive. The amplifier 620 provides a variable gain to the differentiated input signal. The gain is controlled by the controller 622 to scale the differentiated input signal based on, for example, the output of an LMS algorithm.

The circuit 600 subtracts the scaled, differentiated input signal from the equalized and scaled input signal by connecting the output of the pre-cursor amplifier 620 to the main path, at the output of the VGA 616. The subtraction is achieved through crossing the polarities of the main and secondary paths at a location 63 corresponding to the output of pre-cursor amplifier 620 and the output of the VGA 616. The positive polarity of the VGA output is connected to the negative polarity of the pre-cursor amplifier output. The negative polarity of the VGA output is connected to the positive polarity of the pre-cursor amplifier output.

Summing amplifier 624 may sum a feedback signal (not shown) from the DFE with the signal at the output of the VGA 616. The summing amplifier 624 may include a digital-to-analog converter to generate a programmable current that adds a variable amount of the quantized data back into the analog input signal. The pre-cursor corrected input signal is thus amplified before being supplied to the DFE.

Figure 7:
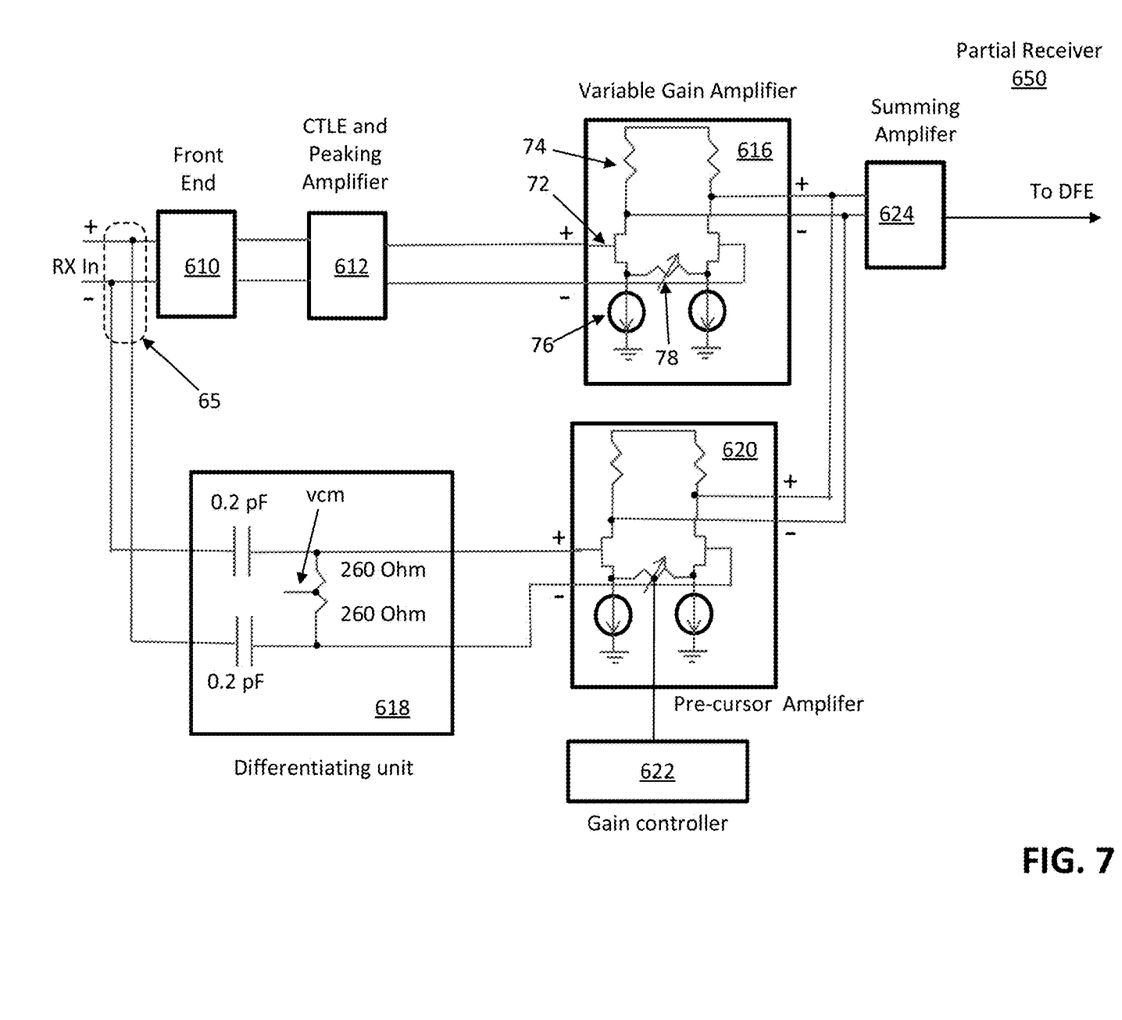
FIG. 7 is a block diagram of a portion of a receiver that implements pre-cursor ISI correction according to an embodiment of the present disclosure.

The circuit 600 can be adapted to support the method of FIG. 2 by removing the differentiating unit and appropriate gain adjustments to the scaling performed by the pre-cursor amplifier 620. Additionally, crossing of polarities may be performed at other locations, even before any scaling or equalization occurs in either path. For example, in the partial receiver 650 of FIG. 7, the polarities are crossed at a location 65 corresponding to the inputs to the front end and the AC coupling capacitors of the secondary path. When the output of the pre-cursor amplifier 620 and the output of the VGA 616 are subsequently combined without crossing polarities, the result is essentially the same as in FIG. 6 since the scaled output of the pre-cursor amplifier 620 is an inverted version of the scaled output in FIG. 6. Similarly, an inverted and scaled representation of the input signal could be combined with an equalized input to implement the method of FIG. 4.

Figure 8:
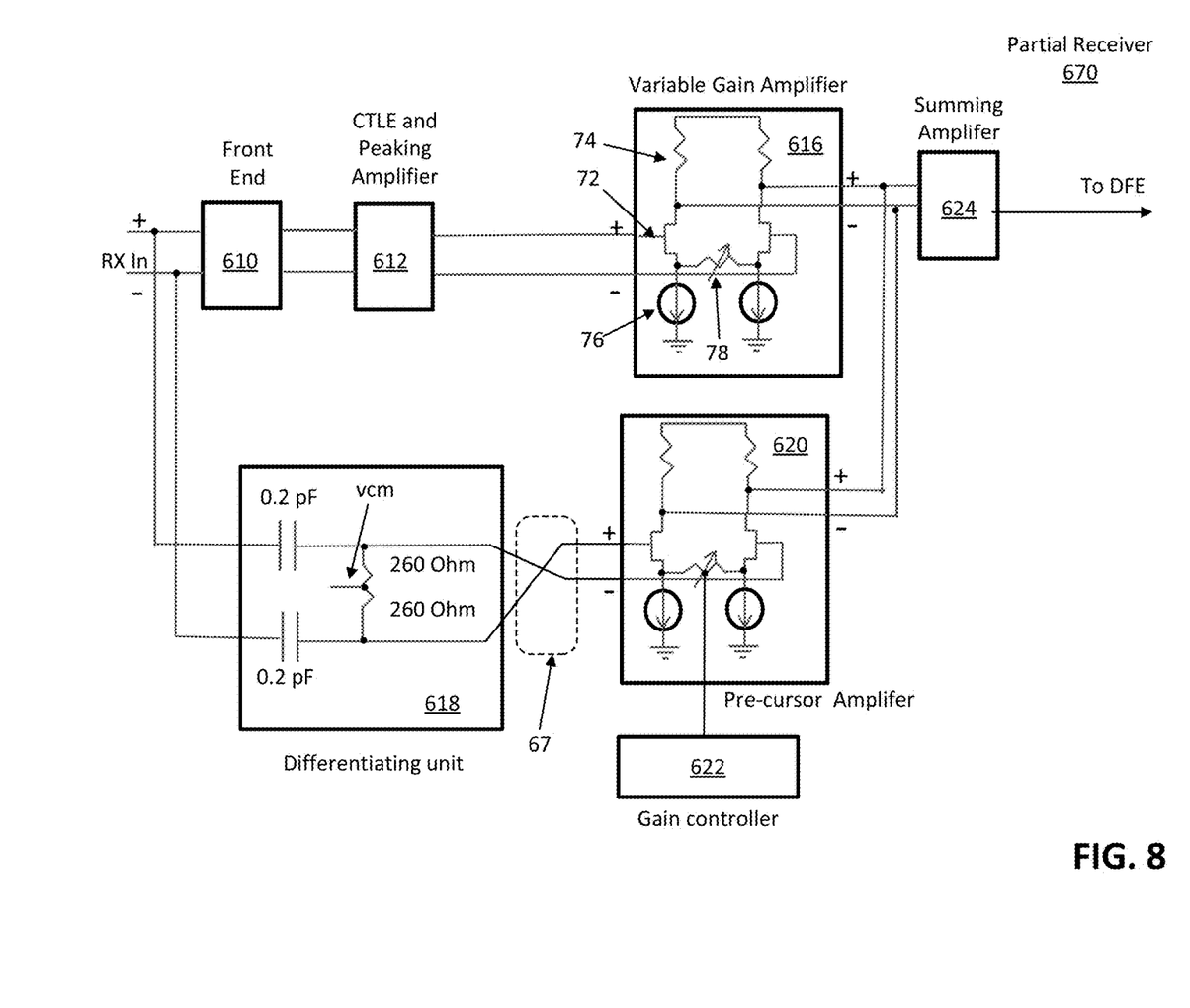
FIG. 8 is a block diagram of a portion of a receiver that implements pre-cursor ISI correction according to an embodiment of the present disclosure.

Another example is shown in FIG. 8, where the crossing of polarities occurs entirely within the secondary path of a partial receiver 670, at a location 67 corresponding to the input to the pre-cursor amplifier 620.

Figure 9:
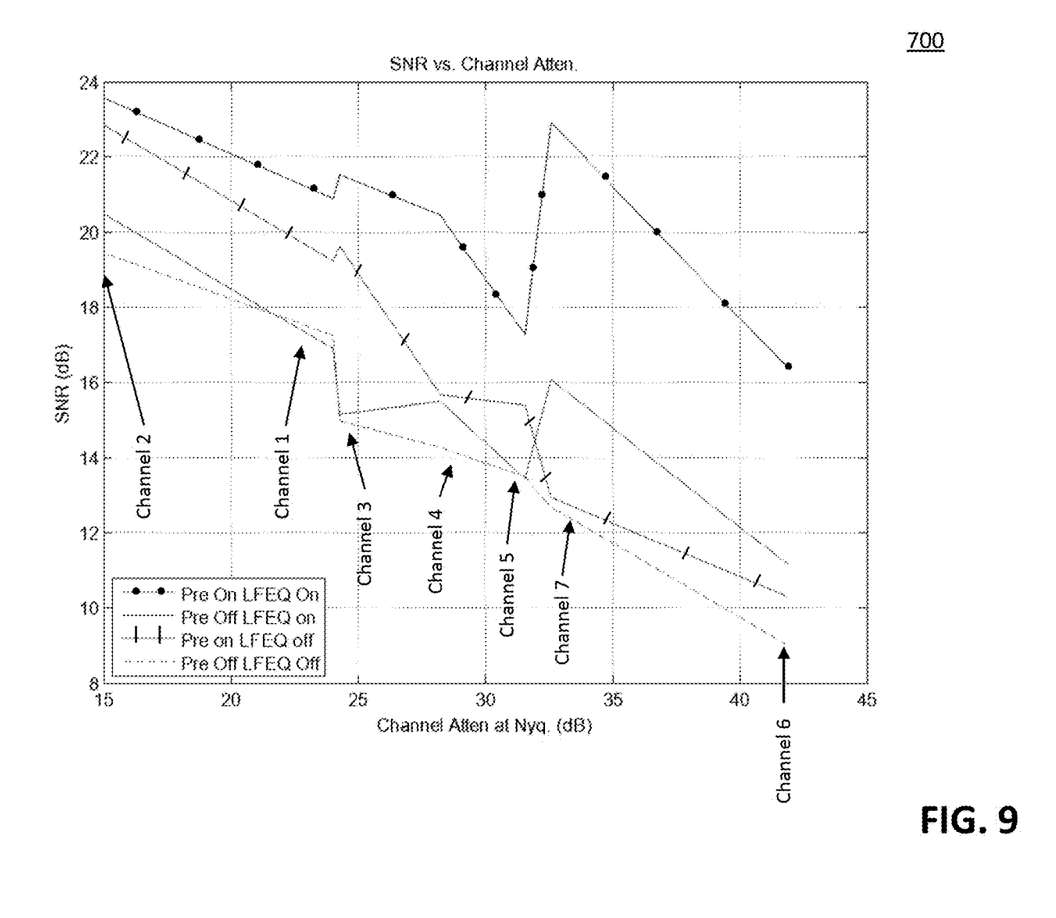
FIG. 9 is a graph of signal-to-noise ratio versus channel attenuation for various scenarios.

FIG. 9 is a graph 700 of signal-to-noise ratio (SNR) versus channel attenuation for various scenarios. The graph 700 was produced by simulating a specific implementation of the circuit 600 in a seven channel setup in which each channel was a separate cable and the frequency responses of the cables differed. The order of the channels from least attenuating to most attenuating is: 2, 1, 3, 4, 5, 7, 6. The simulated circuit added a low frequency equalizer (LFEQ) between the CTLE 612 and the VGA 616 to provide additional equalization in the low frequency range. The LFEQ was designed to compensate for insufficient equalization in the low frequency range by the CTLE 612. As shown, turning pre-cursor correction on by activating the secondary path produced a significant improvement in SNR, all else being the same. The improvement was particularly dramatic when pre-cursor correction was applied in combination with activating the LFEQ.

Figure 10:
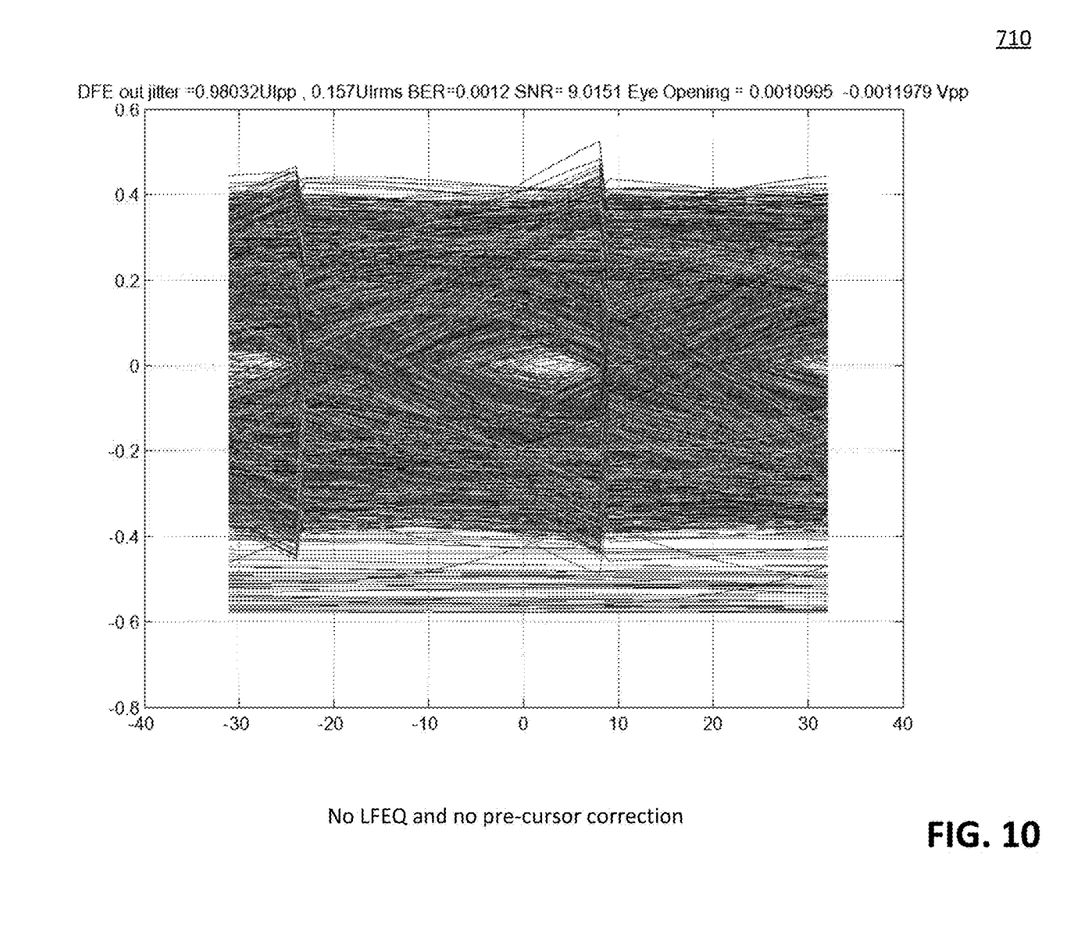
FIG. 10 is a simulated eye diagram for a system without low frequency equalization and without pre-cursor ISI correction.

FIG. 10 is an eye diagram 710 that was produced by simulating the circuit described in connection with FIG. 9, without activating the LFEQ and without pre-cursor correction. The eye is almost fully closed due to ISI.

Figure 11:
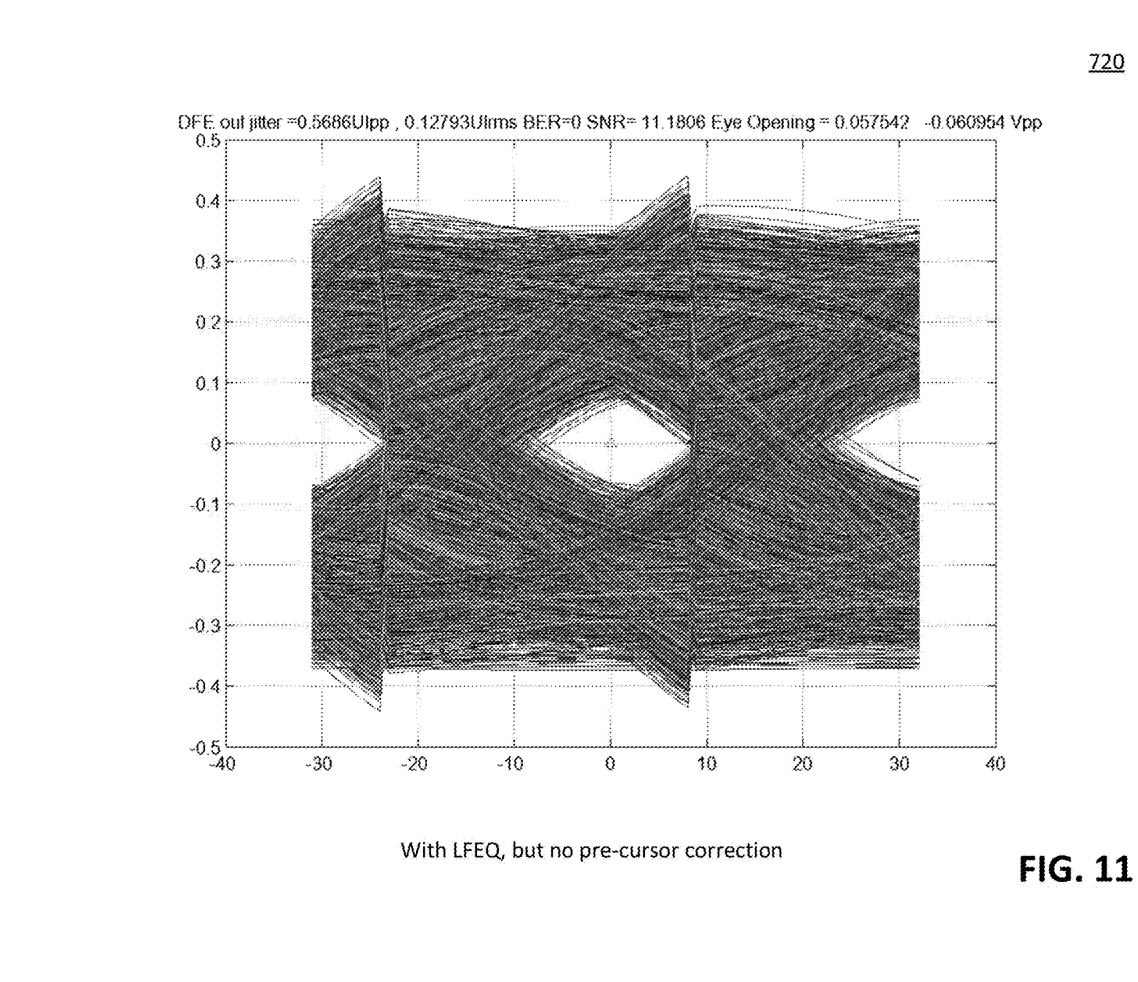
FIG. 11 is a simulated eye diagram for a system with low frequency equalization, but without pre-cursor ISI correction.

FIG. 11 is a simulated eye diagram 720 that was produced by simulating the circuit described in connection with FIG. 9, activating the LFEQ without pre-cursor correction. The eye is significantly more open compared to FIG. 10.

Figure 12:
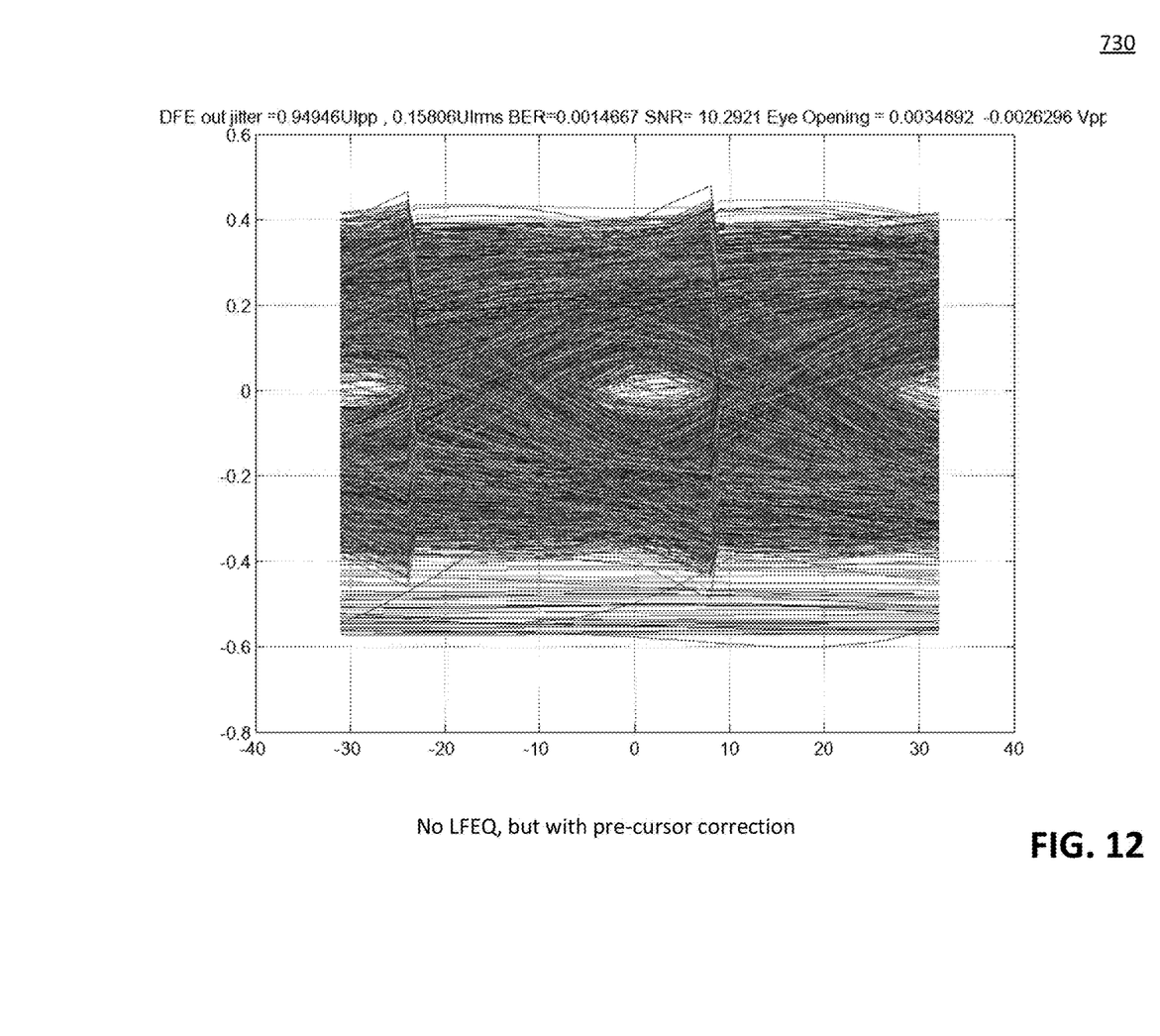
FIG. 12 is a simulated eye diagram for a system without low frequency equalization, but with pre-cursor ISI correction.

FIG. 12 is a simulated eye diagram 730 that was produced by simulating the circuit described in connection with FIG. 9, without activating the LFEQ, but with pre-cursor correction. The eye is more open compared to FIG. 10, but much less so compared to FIG. 11.

Figure 13:
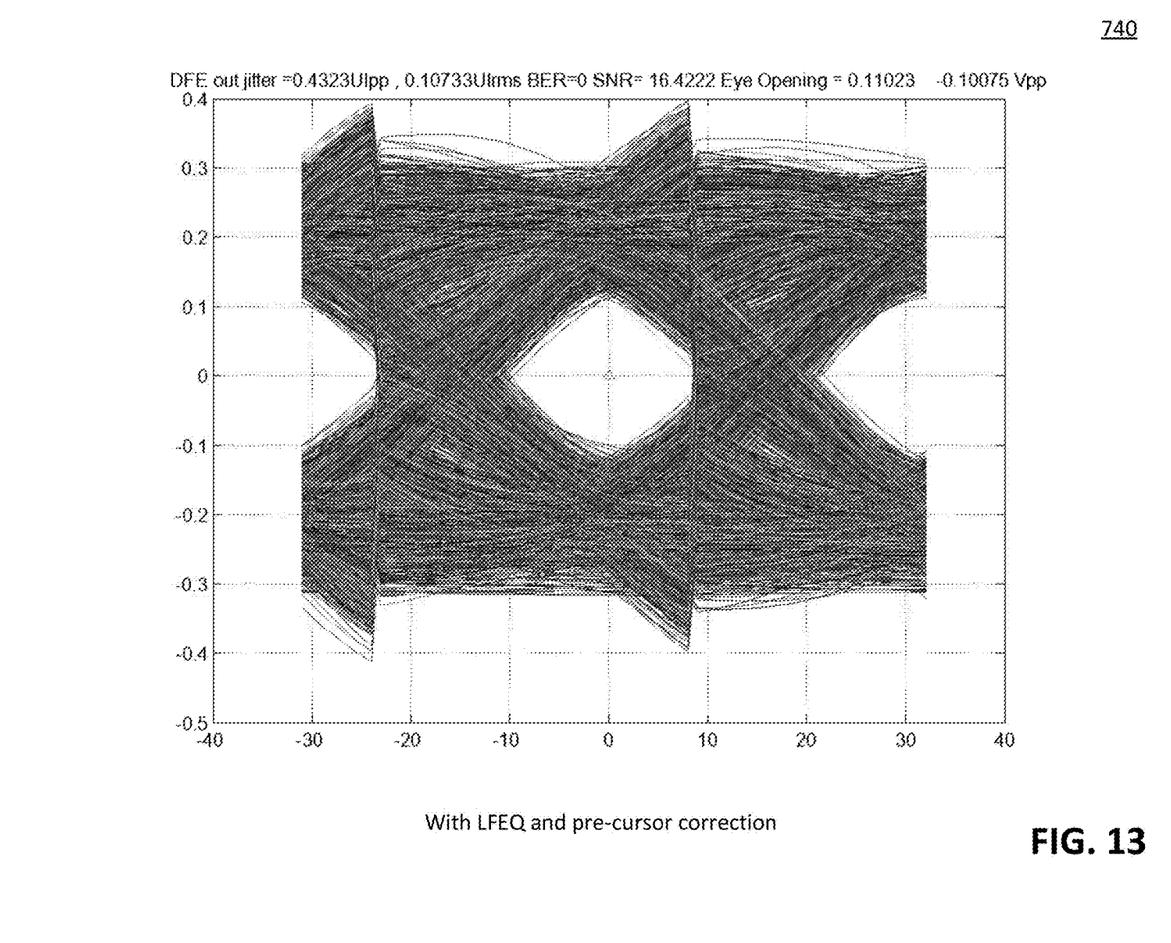
FIG. 13 is a simulated eye diagram for a system with low frequency equalization and with pre-cursor ISI correction.

FIG. 13 is a simulated eye diagram 740 that was produced by simulating the circuit described in connection with FIG. 9, activating the LFEQ in combination with pre-cursor correction. The eye is significantly more open compared to any of FIGS. 10 to 12. Thus, the eye diagrams confirm the conclusions drawn from FIG. 9—that ISI can be reduced using pre-cursor correction in accordance with the disclosed embodiments, especially when combined with low frequency equalization.

The description of the foregoing embodiments may refer to algorithms, sequences, and operations that require processor execution of program instructions stored in memory. Memory may include a computer readable storage medium, which is not limited to, but may include, any type of disk, including floppy disks, optical disks, CD-ROMs, magnetic-optical disks, and other memory such as read-only memory (ROMs), random access memory (RAMs), electrically erasable programmable read-only memory (EEPROM), flash memory, magnetic or optical cards, or any other types of media capable of storing program instructions.

In the foregoing description, various features may be grouped together in a single embodiment for purposes of streamlining the disclosure. This method of disclosure is not to be interpreted as reflecting an intention that the claims require more features than are expressly recited in each claim. Rather, as the following claims reflect, inventive aspects lie in less than all features of a single foregoing disclosed embodiment. Thus, the following claims are hereby incorporated into this description, with each claim standing on its own as a separate embodiment of the invention.

Moreover, it will be apparent to those skilled in the art from consideration of the specification and practice of the present disclosure that various modifications and variations can be made to the disclosed systems and methods without departing from the scope of the disclosure, as claimed. Thus, it is intended that the specification and examples be considered as exemplary only, with a true scope of the present disclosure being indicated by the following claims and their equivalents.

What is claimed is:

1. A method for reducing intersymbol interference due to pre-cursor distortion, the method comprising:
    processing an analog input signal along a first circuit path of a receiver device to form an equalized representation of the input signal;
    processing the input signal along a second, non-equalizing, circuit path that has lower latency than the first circuit path to form a scaled, non-equalized, signal as one of the following: a scaled representation of the input signal, an inverted scaled representation of the input signal, a scaled derivative of the input signal, and an inverted scaled derivative of the input signal; and combining the scaled, non-equalized, signal with the equalized representation, wherein the combining cancels out a pre-cursor portion of the equalized representation to form a pre-cursor corrected signal.

2. The method of claim 1, wherein the scaled signal is the scaled derivative of the input signal or the inverted scaled derivative of the input signal.

3. The method of claim 2, wherein the derivative is formed by AC (Alternate Current) coupling the input signal into a high-pass filter.

4. The method of claim 3, wherein the high-pass filter includes a capacitor that performs the AC coupling and a resistor, and wherein a capacitance of the capacitor and a resistance of the resistor are set such that a pole of the high-pass filter is higher in frequency than a pole of an AC coupling network that couples the input signal into the first circuit path.

5. The method of claim 2, wherein the derivative is scaled using a first amplifier that scales the derivative to a magnitude sufficient to cause the combining to cancel out the pre-cursor portion of the equalized representation.

6. The method of claim 1, wherein the input signal is a differential signal, and wherein the combining is performed by crossing polarities of the equalized signal and the scaled signal if the scaled signal is non-inverted or by not crossing the polarities if the scaled signal is inverted.

7. The method of claim 1, wherein the scaled signal is the scaled representation of the input signal or the inverted scaled representation of the input signal.

8. The method of claim 1, wherein the equalized representation is formed using a continuous time linear equalizer in combination with a variable gain amplifier.

9. The method of claim 1, further comprising:
using an equalizer circuit to remove a residual post-cursor in the pre-cursor corrected signal.

10. The method of claim 9, wherein the equalizer circuit includes at least one of a continuous time linear equalizer and a decision feedback equalizer.

11. A circuit for reducing intersymbol interference due to pre-cursor distortion, the circuit comprising:
a first set of circuit elements located along a first circuit path of a receiver device, wherein the first set of circuit elements process an analog input signal of the receiver device to form an equalized representation of the input signal;

a second set of circuit elements located along a second, non-equalizing, circuit path that has lower latency than the first circuit path, wherein the second set of circuit elements process the input signal to form a scaled, non-equalized, signal as one of the following: a scaled representation of the input signal, an inverted scaled representation of the input signal a scaled derivative of the input signal, and an inverted scaled derivative of the input signal; and a circuit arrangement that combines the scaled, non-equalized, signal with the equalized representation, wherein the circuit arrangement cancels out a pre-cursor portion of the equalized representation to form a pre-cursor corrected signal.

12. The circuit of claim 11, wherein the scaled signal is the scaled derivative of the input signal or the inverted scaled derivative of the input signal.

13. The circuit of claim 12, wherein the derivative is formed by AC (Alternate Current) coupling the input signal into a high-pass filter.

14. The circuit of claim 13, wherein the high-pass filter includes a capacitor that performs the AC coupling and a resistor, and wherein a capacitance of the capacitor and a resistance of the resistor are set such that a pole of the high-pass filter is higher in frequency than a pole of an AC coupling network that couples the input signal into the first circuit path.

15. The circuit of claim 12, wherein the derivative is scaled by a first amplifier that scales the derivative to a magnitude sufficient to cause the combining to cancel out the pre-cursor portion of the equalized representation.

16. The circuit of claim 11, wherein the input signal is a differential signal, and wherein the combining is performed by crossing polarities of the equalized signal and the scaled signal if the scaled signal is non-inverted or by not crossing the polarities if the scaled signal is inverted.

17. The circuit of claim 11, wherein the scaled signal is the scaled representation of the input signal or the inverted scaled representation of the input signal.

18. The circuit of claim 11, wherein the equalized representation is formed by a continuous time linear equalizer in combination with a variable gain amplifier.

19. The circuit of claim 11, further comprising:
an equalizer circuit configured to remove a residual post-cursor in the pre-cursor corrected signal.

20. The circuit of claim 19, wherein the equalizer circuit includes at least one of a continuous time linear equalizer and a decision feedback equalizer.

* * * * *